(12) United States Patent
Marriott et al.

(10) Patent No.: US 6,254,160 B1
(45) Date of Patent: Jul. 3, 2001

(54) CATERING UNIT FOR MOTOR VEHICLES

(76) Inventors: Edgar Aubrey Marriott, The Telephone Exchange, New Road, Crockham Hill, Edenbridge, Kent (GB), TN8 6TE; William Edward Mariner, 44 Stoneleigh Road, Limpsfield Chart, Oxted, Surrey (GB), RH8 0TR ( * ) Notice: Subject to any disclaimer, the term of this patent is extended or adjusted under 35 U.S.C. 154(b) by 0 days.

(21) Appl. No.: 09/409,158

(22) Filed: Sep. 30, 1999

(51) Int. Cl.[7] ........................................ B60P 3/05
(52) U.S. Cl. ............... 296/24.1; 99/357; 126/38; 126/39 B
(58) Field of Search ............... 296/24.1; 99/357; 126/38, 39 B

(56) References Cited

U.S. PATENT DOCUMENTS

| | | | | |
|---|---|---|---|---|
| 2,867,471 | * | 1/1959 | Coon | 296/156 |
| 3,694,023 | * | 9/1972 | Burgess | 296/24.1 |
| 3,705,743 | * | 12/1972 | Toomey | 296/24.1 |
| 3,807,789 | * | 4/1974 | Turquin | 296/24.1 |
| 4,581,902 | * | 4/1986 | Starck et al. | 62/258 |
| 4,666,204 | * | 5/1987 | Reinholtz | 296/24.1 |
| 4,969,678 | * | 11/1990 | Loisel | 296/24.1 |
| 4,989,535 | * | 2/1991 | Lacasse et al. | 114/343 |
| 5,173,052 | * | 12/1992 | Duncan | 296/24.1 |
| 5,350,081 | * | 9/1994 | Graham | 220/737 |
| 5,443,239 | | 8/1995 | Laporte . | |
| 5,662,373 | * | 9/1997 | Hanemaayer | 296/24.1 |
| 5,678,883 | * | 10/1997 | Bittner et al. | 296/24.1 |
| 5,730,282 | * | 3/1998 | Bureau | 206/223 |
| 5,833,295 | * | 11/1998 | Farlow | 296/24.1 |
| 5,860,281 | * | 1/1999 | Coffee et al. | 62/3.62 |
| 5,862,540 | * | 1/1999 | Chuan | 4/449 |

FOREIGN PATENT DOCUMENTS

| | | | |
|---|---|---|---|
| 26 05 760 | 8/1977 | (DE) . | |
| 2904113 | * 8/1980 | (DE) | 196/156 |
| 3241242 | * 5/1984 | (DE) | 296/22 |
| 43 29 105 | 3/1995 | (DE) . | |
| 29 61 675 | 12/1996 | (DE) . | |
| 2 714 639 | 7/1995 | (FR) . | |
| 2047635 | * 12/1980 | (GB) | 296/24.1 |
| 2 197 628 | 5/1988 | (GB) . | |
| 2 328 651 | 3/1999 | (GB) . | |
| 97/41001 | 11/1997 | (WO) . | |

OTHER PUBLICATIONS

Danby Products, Danby Compact Kitchen, sales literature, date known.

* cited by examiner

Primary Examiner—Joseph D. Pape
Assistant Examiner—Kiran B. Patel
(74) Attorney, Agent, or Firm—Rankin, Hill, Porter & Clark, LLP

(57) ABSTRACT

A catering unit suitable for transportation in, and suitable for use in, a motor vehicle, especially a non-commercial motor vehicle such as a car. The catering unit (10) comprises a housing (12); a sink (26) disposed in an upper face of the housing (12); at least one gas burner (28) disposed in said face of the housing (12); a temperature-regulating storage unit (110) disposed within the housing:(12); a water supply reservoir (96) disposed within the housing (12), for supplying water to the sink (26); and a waste water reservoir (100) disposed within the housing (12), for storing waste water from the sink (12). The size and weight of the catering unit (10) are such that the it is portable in the sense that it can be placed into and removed from a motor vehicle by hand.

20 Claims, 7 Drawing Sheets

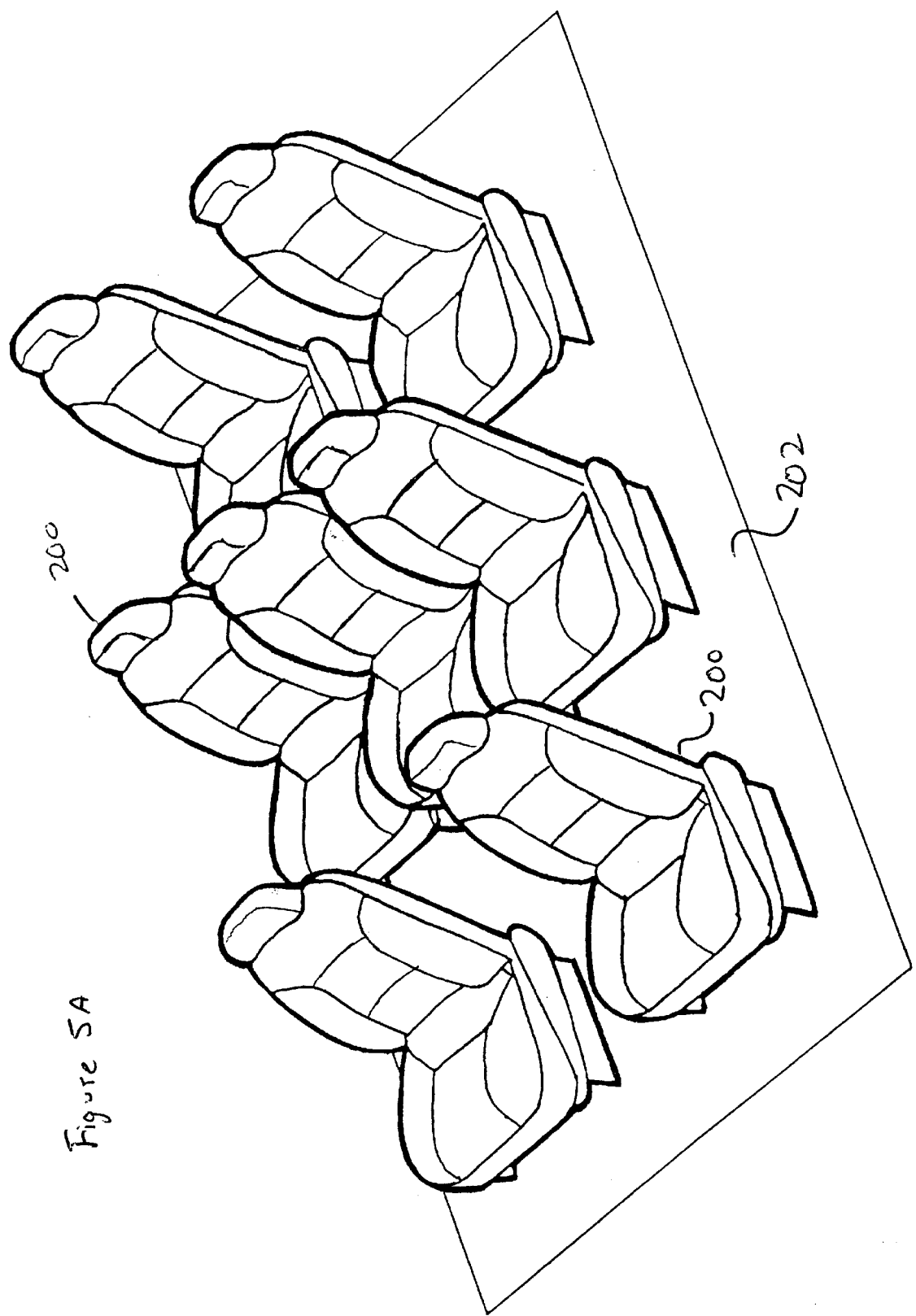

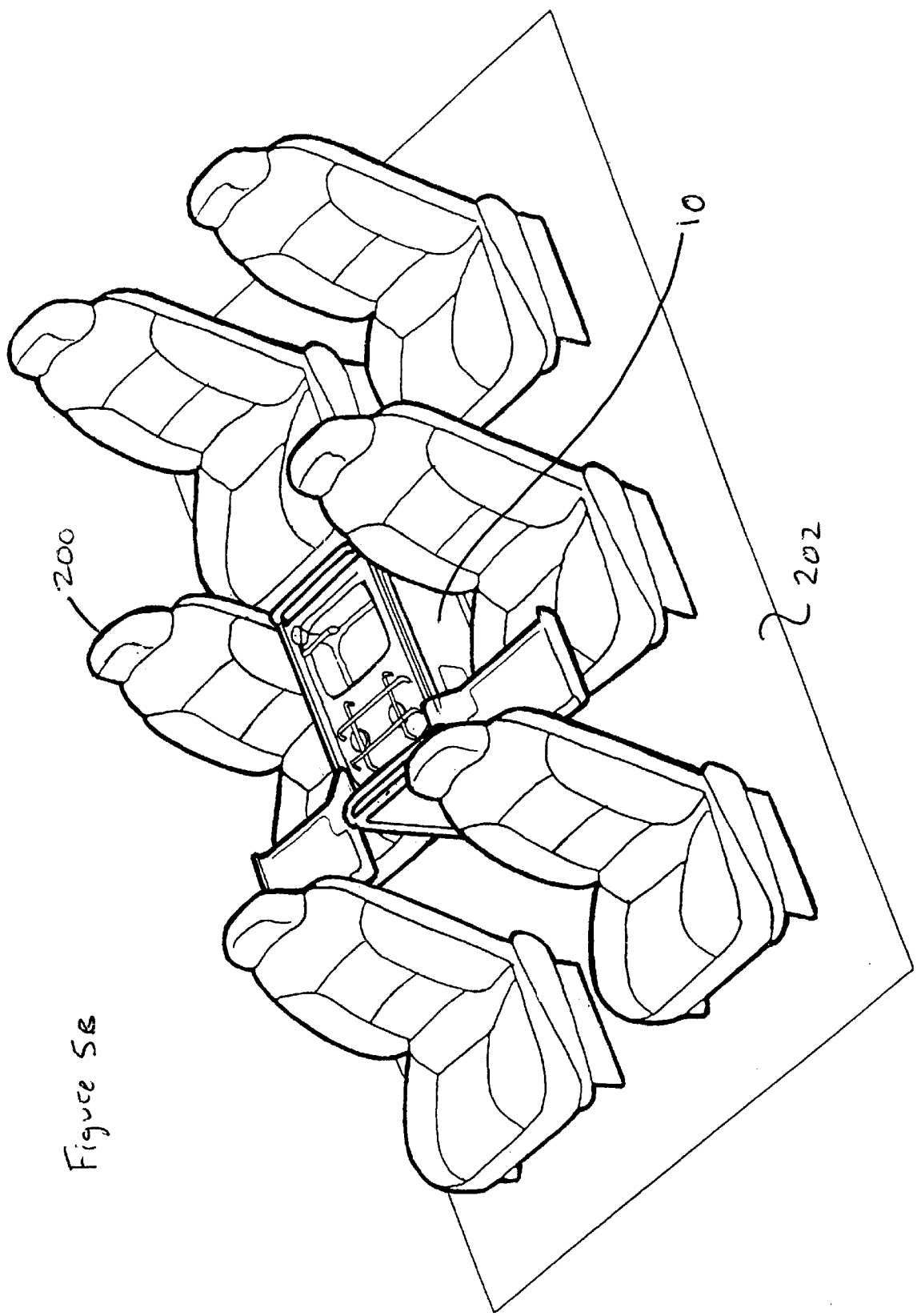

CATERING UNIT FOR MOTOR VEHICLES

BACKGROUND OF THE INVENTION

The present invention relates to a catering unit for motor vehicles, and more particularly relates to a catering unit for multi-purpose vehicles (MPVs), 4×4's, estate cars, pick-up trucks, station wagons and other recreational vehicles.

It is well known to provide catering facilities for use in vehicles. Such facilities have long been provided in vehicles such as motor homes, coaches, caravans and trailers. For example, German patent publication number DT 2 605 760 A1 discloses a demountable kitchen unit for a bus. The equipment is bolted to the floor of the bus as a replacement fitting for one pair of seats, and using similar fasteners as the seats. The equipment faces the gangway and provides a simple cooking facility as well as food storage, water heating and washing. Waste paper is collected in a removable container in the bottom of the unit. A refrigerated compartment can also be used. This equipment is large and heavy, and it takes up the space occupied by two normal seats. Although it can be removed from the bus, it is clear that the equipment is not portable, i.e., it can not be easily carried or moved by hand.

In German patent publication number 4 329 105 A1 there is described mobile office system including a purpose made unit for replacing the front passenger seat of a motor vehicle. The unit has a worktop on which the driver can position documentation. The worktop can be provided in hinged sections to extend into a sleeping bunk. The unit has a support console which can be used to carry other equipment such as office machines, a coffee maker, or a cool box.

International patent publication number WO97/41001 discloses a fastening system for removably securing equipment to a motor vehicle. This system is particularly useful for the type of vehicles known as "minivans". Fastening systems are also disclosed in a number of other documents. For example, German patent publication number DE 2 961 675 discloses a fixing device for mounting a bicycle to a vehicle. UK patent publication number GB 2 197 628 discloses a means to fix a wheelchair to a vehicle. U.S. Pat. No. 5,443,239 discloses a means to fix a seat to a motor vehicle.

SUMMARY OF THE INVENTION

It is an object of the present invention to provide a catering unit which is suitable for being transported in non-commercial motor vehicles, such as family automobiles, especially MPVs, 4×4's, estate cars, pick-up trucks, station wagons, and other recreational vehicles. 4×4's are also known as "off-roaders", and examples of such vehicles are sold under the names Landrover and Rangerover.

It is a further object of the invention to provide a catering unit which is removably securable to a motor vehicle.

It is a further object of the invention to provide a catering unit which is removably securable to a MPV in place of one of the seats of the MPV.

In accordance with one aspect of the present invention there is provided a catering unit comprising; a housing; a sink disposed in one face of the housing; at least one gas burner disposed in said face of the housing; a temperature regulated storage unit disposed within the housing; a water supply reservoir disposed within the housing, for supplying water to the sink; and a waste water reservoir disposed within the housing, for storing waste water from the sink; wherein the size and weight of the catering unit are such that the unit is portable in the sense that it can be placed into and removed from a motor vehicle by hand.

Thus the catering unit according to the invention provides the user with all the essential catering facilities, including a cooking facility, a washing facility, and a facility to keep food and/or beverages at a desired temperature.

It will be appreciated that the size and weight of the catering unit according to the invention may vary over a wide range. The overriding concern is to ensure that the unit is portable. To this end, we prefer that the dimensions of the housing are preferably about 0.7 m×0.7 m×0.7 m or less. A catering unit above this size could not be considered portable. Thus, in order to ensure that the catering unit is portable, the maximum volume of the housing is about 0.343 $m^3$. However, in order to provide improved portabilility, we prefer that the volume of the housing is about 0.3 $m^3$ or less, more preferably about 0.25 $m^3$ or less, and most preferably about 0.2 $m^3$ or less. As mentioned above, the maximum length of the housing in any direction should be 0.7 m or less, but we prefer that the maximum length is under 0.66 m. In general the minimum length of the housing would be about 0.4 m, in order to provide sufficient space for all the necessary components; thus, our preferred minimum volume for the catering unit is about 0.064 $m^3$. One particularly suitable size for the housing is 0.65 m×0.65 m×0.45 m. Another particularly suitable size Is 0.654 m×0.625 m×0.455 m.

The weight of the unit should be about 30 kg or less, in order to provide adequate portability. Preferably the weight of the unit is about 25 kg or less. The minimum practical weight of the unit is generally about 10 kg. These weights refer to the catering unit when the water supply reservoir, the water waste reservoirs, and the hot and/or cool box are empty, and when the unit does not contain any gas cylinder for the gas burner.

We prefer that the housing includes a compartment which can receive a gas cylinder for supplying gas to the gas burner. The gas cylinder can be conventional, as can the means to supply to gas from the cylinder to the gas burner. The gas burner itself is also conventional. Any suitable gas can be used, including propane, butane, etc. In our preferred embodiment, there are two gas burners provided in said face of the housing. The gas burners can be supplied from a common gas cylinder.

Preferably the water supply reservoir is removable in order to facilitate filling with fresh water. The fresh water can be taken from any suitable source, and would typically be obtained from a domestic tap. We prefer that the capacity of the water supply reservoir is from about 5 litres to about 15 litres, more preferably from about 9 litres to about 15 litres. Most preferably the capacity of the water supply reservoir is about 9 litres.

Preferably the waste water reservoir is removable in order to facilitate discharge of waste water We prefer that the capacity of the waste water reservoir is at least as great as the capacity of the water supply reservoir. We prefer that the capacity of the waste water reservoir is from about 5 litres to about 15 litres, more preferably from about 9 litres to about 15 litres. Most preferably the capacity of the waste water reservoir is about 9 litres.

The temperature-regulated storage unit may simply comprise an insulated container adapted to insulate its contents from ambient temperatures. Thus, the temperature-regulated storage unit may be used to keep chilled food and beverages cool. Or it may be used to keep hot food and beverages warm.

We prefer that the temperature-regulated storage unit comprises an insulated container having a temperature regulating means for maintaining the interior of the container at a desired temperature. The desired temperature may be, for example, within about 26° C. of ambient. The temperature-regulated. storage unit may be a cold box, i.e., it may have means to maintain the temperature be low ambient (e.g. up to 26° C. below ambient), or it may be a hot box, i.e., it may have means to maintain the temperature above ambient (e.g. up to 26° C. above ambient). Preferably the temperature-regulated storage unit is a combined hot/cool box, i.e. it has means to maintain the temperature above or below ambient (eg within ±26° C. of ambient). The temperature-regulated storage unit is preferably powered so that it can provide energy to maintain the temperature at a desired level. Most preferably, the temperature-regulated storage unit is provided with means to connect it to a power source in a vehicle. In the preferred embodiment, the temperature-regulated storage unit is provided with means to connect it to a cigarette lighter in a vehicle; such means is, in itself, conventional. In the case of a combined hot/cool box the maintained temperature may be altered from above ambient to below ambient, or from below ambient to above ambient, by reversing the polarity.

If desired, it is possible to provide the catering unit according to the invention with more than one temperature-regulated storage unit.

Preferably, doors are provided at two opposite ends of the housing for providing access to the interior of the housing. The provision of separate doors at two ends of the housing facilitates easy access to the interior of the catering unit.

In a preferred embodiment, the housing includes an upper lid which is pivotable between a closed position in which the lid covers the sink and the gas burner, and an open position in which the lid exposes the sink and the gas burner for use. Most preferably, the inside surface of the lid is configured such that is can be used as a table when the lid is in the open position. It is also preferred that the lid is provided which an aperture which can receive a cup, so that the lid incorporates a cup holder.

In a particularly advantageous construction, the lid comprises two lid portions each of which is independently movable between the open and closed positions.

Advantageously also, the catering unit further comprises two support rails mounted on opposite sides of the housing, and each lid portion is mounted on a respective one of said support rails, whereby, when the lid portions are both pivoted to the open position, a separate table is provided by the lid portions on each side of the housing.

The lid portions are preferably slidable along the support rails, so that, when they are acting as tables, their position can be adjusted.

The catering unit according to the invention may be easily transported in most types of motor vehicle, but it is intended primarily for use,with non-commercial motor vehicles, such as family cars. The catering unit may be transported in the trunk (i.e., the boot in UK terminology) of saloon cars, or in the back of estate cars. Securing means may be provided to enable the catering unit to be held in place.

As mentioned above, the catering unit is especially suitable for use in MPVs. MPVs typically comprise a tall (relative to the size of a normal saloon car) van-like body having a spacious single volume cabin containing a number of individual removable seats—the number of seats may vary: typically there would be, up to seven seats, but there could be more. In accordance with the present invention, the catering unit according to the present invention may be fixed in the MPV in place of one of the seats. To this end, the catering unit preferably also includes a securing means which enables it to be fixed to the seat fixings provided within the MPV. The securing means is preferably adjustable to enable the catering unit to be secured to the seat fixings of different makes of MPV.

The catering unit may be used within the motor vehicle itself or it may be removed from the vehicle for use at a nearby location. Thus, the catering unit can be removed from the vehicle for use at a picnic in the countryside.

According to another aspect of the invention there is provided a catering unit comprising: a housing; a sink disposed in one face of the housing; at least one gas burner disposed in said face of the housing; a temperature-regulated storage unit disposed within the housing; a water supply reservoir disposed within the housing, for supplying water to the sink; a waste water reservoir disposed within the housing, for storing waste water from the sink; a door in at least one, end of the housing for accessing an interior thereof; and tops lids which form a cover for the housing and which open up to form work surfaces which also incorporate landing space for beverage containers, wherein the size and weight of the catering unit are such that the unit is portable in the sense that it can be placed into and removed from a motor vehicle by hand.

Preferably a further door is provided in an opposite end of the housing to the first door.

According to another aspect of the invention there is provided a method of providing catering facilities in a multi-purpose vehicle of the type comprising a plurality of vehicle seats at least one of which is removable, said method comprising:

(a) removing at least one of the seats of the multi-purpose vehicle;

(b) securing a catering unit to the multi-purpose vehicle in place of the removed seats, the catering unit comprising a housing; a sink disposed in one face of the housing; at least one gas burner disposed in said face of the housing; a temperature-regulated storage unit disposed within the housing; a water supply reservoir disposed within the housing, for supplying water to the sink; and a waste water reservoir disposed within the housing, for storing waste water from the sink, the size and weight of the catering unit being such that the unit is portable in the sense that it can be placed into and removed from a motor vehicle by hand.

Preferably, the catering unit is secured to the vehicle using the vehicle fixings provided for securing the removed seat to the vehicle.

This method can be employed with any vehicle having removable seats, including 4×4's, estate cars, pick-up trucks, station wagons and other recreational vehicles BRIEF

DESCRIPTION OF THE DRAWINGS

For a more complete understanding of the features and advantages of the present invention, reference is now made to the detailed description of the invention along with the accompanying figures in which:

FIG. 5A shows a view of an MPV interior; and

FIG. 5B shows a view of the MPV interior, in which a seat has been removed and replaced with the catering unit shown in FIG. 1.

DETAILED DESCRIPTION OF THE DRAWINGS

Figure 1:
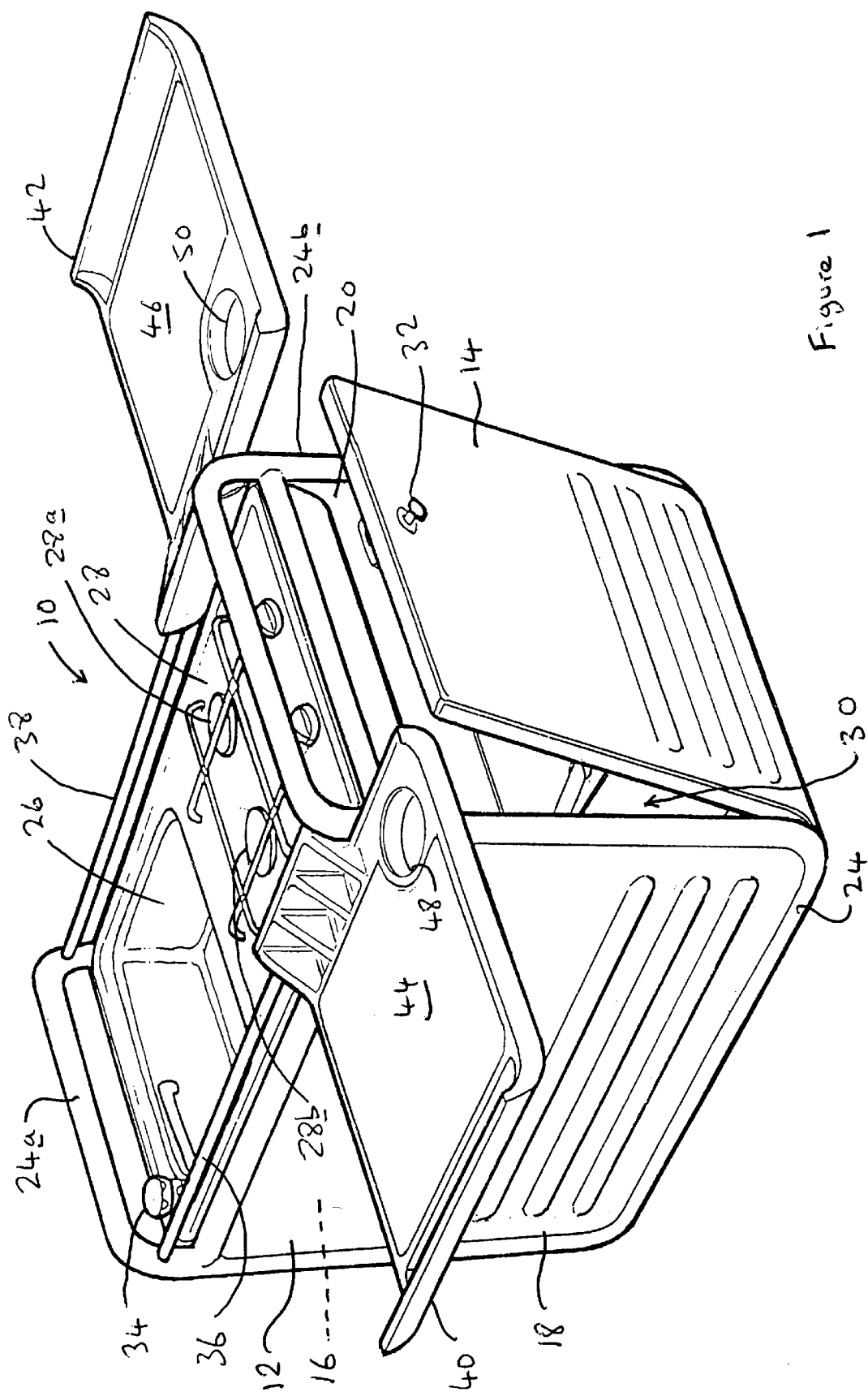
FIG. 1 is a perspective view of an embodiment of a catering unit in accordance with the present invention.
Figure 1A:
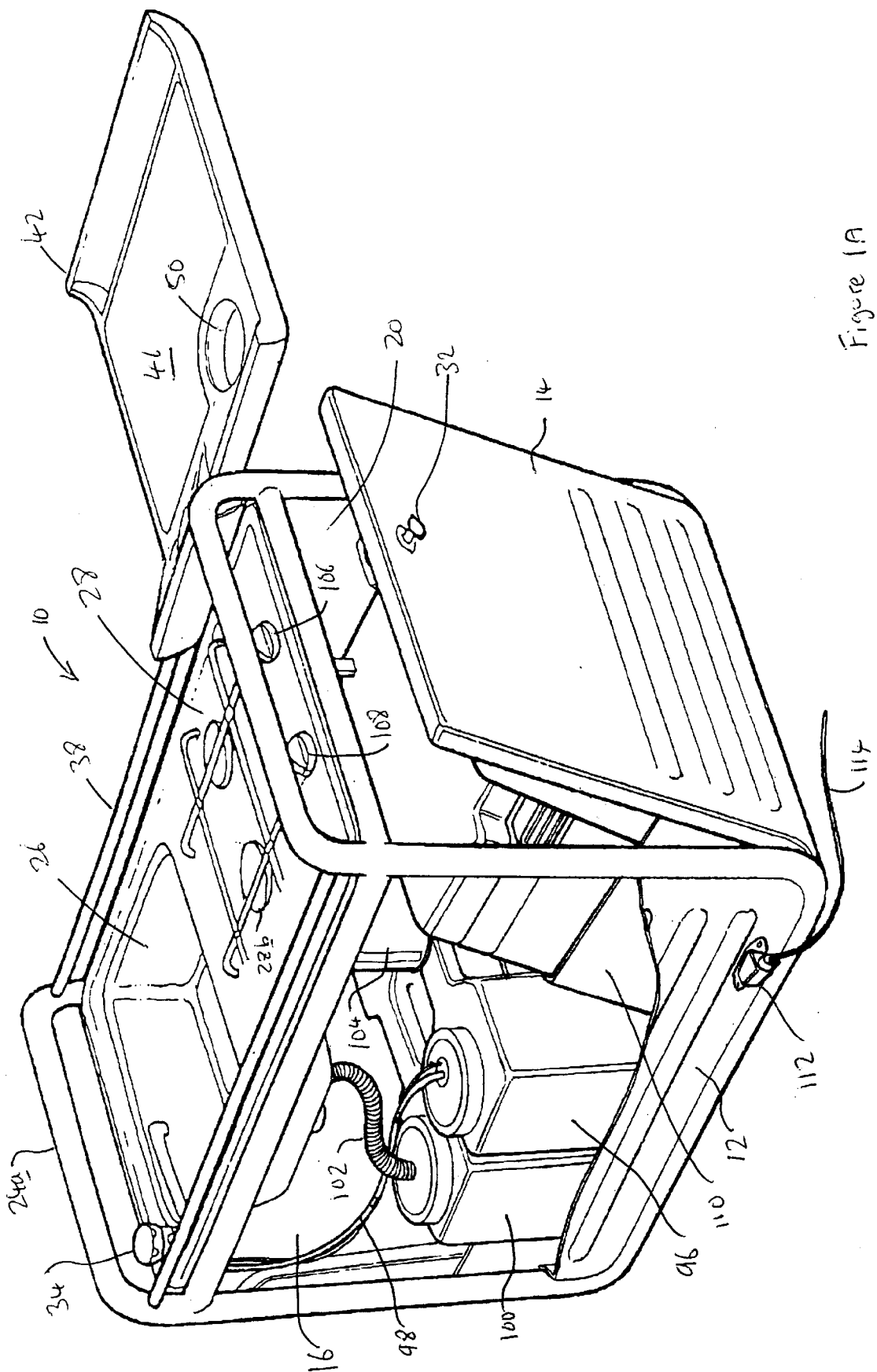
FIG. 1A is a perspective view of the catering unit shown in FIG. 1 with part broken away so that the interior is visible.

The drawings illustrate a catering unit generally designated 10 which comprises housing 12. The housing 12 comprises front and rear panels 14, 16 side panels 18, 20 and a base panel 22, all of which are mounted on a steel support frame 24. The frame 24 includes upper portions 24a and 24b which form hand grips by means of which the unit 10 may be manually lifted.

The upper part of the catering unit 10 is provided with a sink 26 and a two-burner gas hob 28 having burners 28a and 28b. The front panel 14 is hingedly mounted to the frame 24 in order to provide a door through which an interior 30 of the housing 12 can be accessed The front panel 14 includes a catch 32 for securing the front panel 14 in closed position.

Within the interior 30 there is disposed a water supply reservoir 96 for the sink 26. The sink 26 includes a tap 34 for drawing water from the water supply reservoir 96 via a supply water conduit 98. An electric pump mechanism (not shown) may be provided for pumping water from the water supply reservoir 96 to the sink 26 via the tap 34. The pump may be powered by a portable battery (not shown), such as a car battery (e.g. via the car cigarette lighter). As an alternative, a manual pump could be provided for pumping water from the water supply reservoir 96 to the sink 26 via the tap 34.

Within the interior 30 there is also disposed a waste water reservoir 100 for receiving and storing waste water from the sink 26. The sink may also include a plug hole (not shown) which communicates with the waste water reservoir 100, and a plug (not shown) for plugging the plug hole. The plug may be built into the sink 26. The plug communicates with the waste water reservoir 100 via a waste water conduit 102.

Within the interior 30 there is also disposed a gas cylinder 104 for supplying gas to the hob 28. The gas supply to each burner 28a and 28b can be turned on and off using gas taps 106 and 108 respectively.

Within the interior 30 there is also disposed a combined hot/cool box 110. The hot/cool box 110 may be powered by a portable battery (not shown), such as a car battery (e.g. via the car cigarette lighter). The temperature of the interior of the hot/cool box 110 can be selectively controlled to provide a temperature above or below ambient.

The remainder of the interior 30 provides a storage area for items such as spare gas cylinders; food and drink; cutlery; and or crockery.

The side panel 18 is provided with an electrical socket 112 (which is not shown in FIG. 1), which can be connected to the battery (e.g. via the cigarette lighter) by means of a wire 114. The socket 112 is electrically connected to the electrical pump for the supply water and to the hot/cool box 110.

The upper part of the unit 10 includes two parallel guide rails 36 and 38 which 25 are secured to the frame 24. A lid portion 40 is hingedly mounted to the guide rail 36, and a lid portion 42 is hingedly mounted to the guide rail 38. The lid portions 40 and 42 are independently pivotable between an open position (as shown in FIG. 1) in which they do not cover the sink 26 or the hob 28, and a closed position, as shown in FIG. 2, in which they do cover the sink 26 or the hob 28, The lid portions 40 and 42 are freely slidable along the guide rails 36 and 38 and are dimensioned so that, when correctly positioned, they can substantially completely cover the sink 26 and the hob 28.

The lid portions 40 and 42 include an interior support surface 44 and 46 respectively, which can act as a table when the lid portions 40 and 42 have been pivoted to the open position shown in FIG. 1. The lid portions 40 and 42 also include a cup holder 48 and 50 respectively which are formed by apertures in the lid portions 40 and 42.

Whilst the unit 10 may be provided with mountings upon its base specifically positioned to engage directly with vehicle-specific mounting points, it has been found more generally useful to produce a common base structure for the catering unit 10, and to provide ancillary mounting means, such as a sub-frame, specific to a particular vehicle, all such ancillary mountings, including sub-frames, having a common attachment to the catering unit 10, whilst being provided with vehicle-specific attachments for engagement with the vehicle integral seat mountings.

Figure 2A:
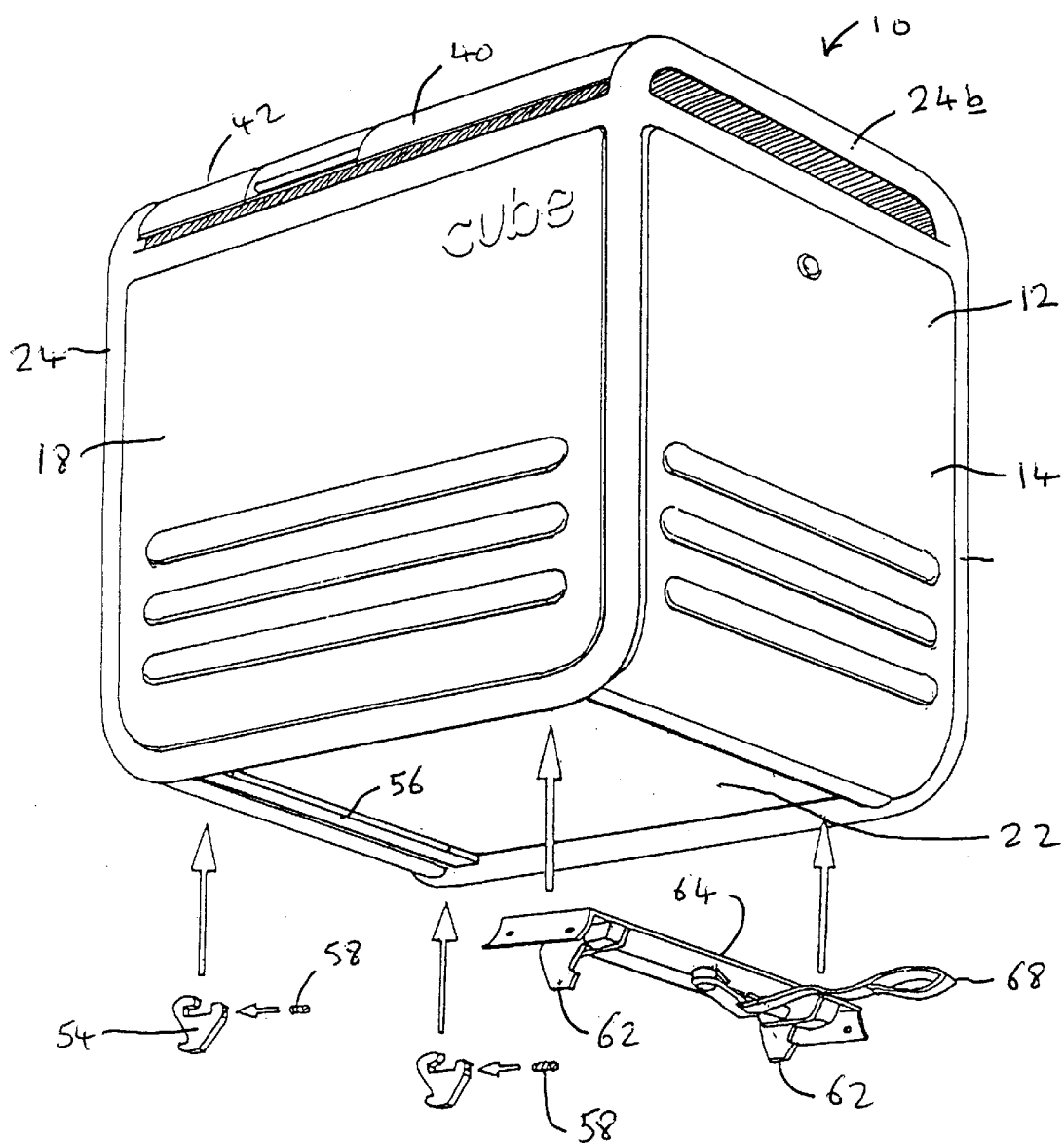
FIG. 2A is an exploded diagram illustrating one embodiment of the fixing of the catering unit shown in FIG. 1 to a vehicle.
Figure 2B:
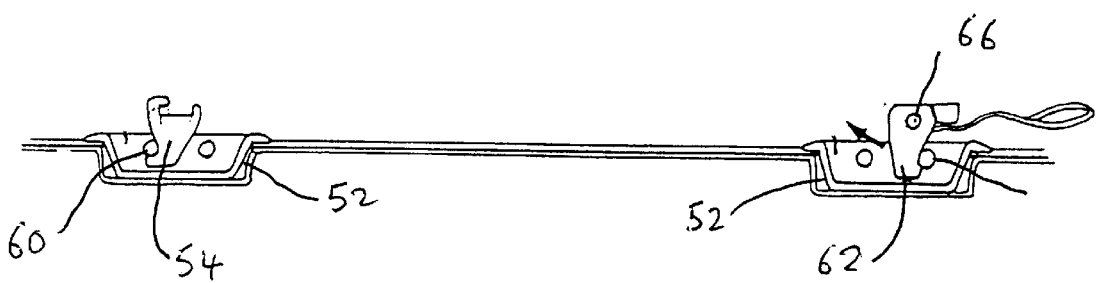
FIG. 2B shows the way in which the catering unit is fixed to the vehicle using the fixing embodiment of FIG. 2A.

Referring specifically to FIGS. 2A and 2B, the unit 10 is mounted upon two of the four vacant vehicle seat mounting escutcheons 52 by means of a pair of rear locating lugs 54, which position on and are slidable along member 56 forming part of the structure of unit 10. The lugs 54 are, when appropriately separated along member 56, locked into positions corresponding with the spacing-of one pair of the seat mounting escutcheons 52, by means of means of screws 58, and engage pins 60 in the respective escutcheons 52.

The front pair of seat mounting escutcheons 52 are engaged by a further pair of lugs 62, carried upon a subframe member 64 and positioned upon that sub-frame 64 in positions corresponding with the rear pair of seat mounting escutcheons 52. The positioning of lugs 62 will be vehicle specific, and a different size of the sub-frame 64 may be provided for each vehicle type, or each group of vehicle types with common seat mountings.

However a common mounting configuration for all sizes of subframes 64 is provided upon the base of each catering unit 10. It will be appreciated that by this means, the subframe 64 is the only component of the catering unit 10 vehicle specific.

For ease of location and attachment of lugs 62, and hence unit 10, to front escutcheons 52, lugs 62 may be sprung-mounted about pivots 66 upon sub-frame 64 to provide a self-latching action on to the pins 60 of the escutcheons, and be provided with a cammed or other shared release mechanism activated by a strap or lever 68, acting to release both lugs 62 simultaneously from the pins 60.

Figure 3A:
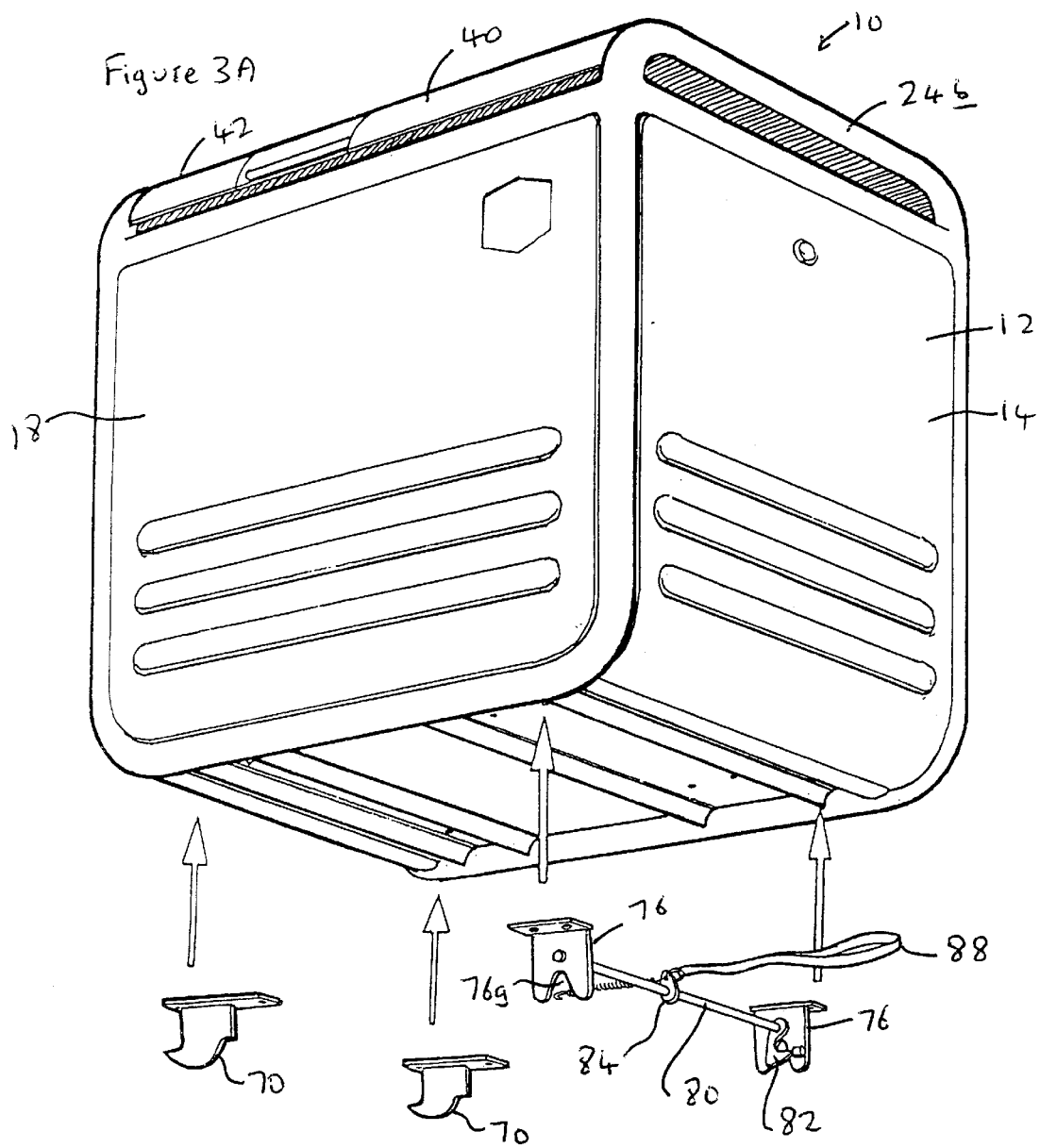
FIG. 3A is an exploded diagram illustrating an alternative embodiment of the fixing of the catering unit shown in FIG. 1 to a vehicle.
Figure 3B:
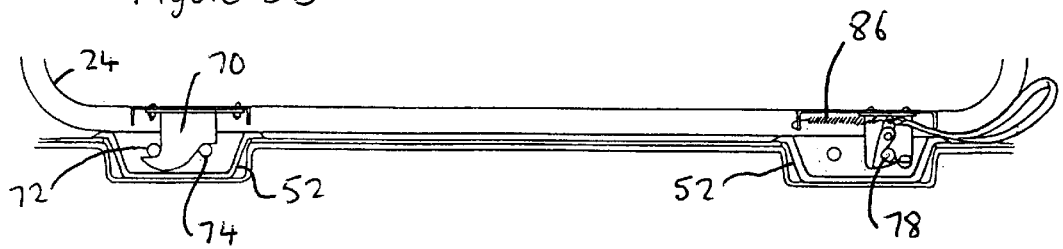
FIG. 3B shows the way in which the catering unit is fixed to the vehicle using the fixing embodiment of FIG. 3A.

FIGS. 3A and 3B illustrate an alternative means of securing the catering unit 10 to a vehicle. The base panel 22 of the catering unit show. in FIGS. 3A and 3B is slightly different from the configuration of the catering. unit shown in FIGS. 2A and 2B. Save for this difference, and for differences in the fixing means to be described below, the catering unit 10 shown in FIGS. 3A and 3B is substantially the same as the catering unit 10 shown in FIGS. 1, 2A and 2B.

In this embodiment, the unit 10 includes a pair of rear fixing lugs 70 which are secured by screws (not shown) to the base panel 22. The fixing lugs 70 are arranged to engage the rear pair of escutcheons 52. The lugs 70 are configured to have an upper surface adapted to bear against the lower part of fixing pins 72 on the vehicle, and to have a lower surface adapted to bear against the upper part of fixing pins 74 on the vehicle.

A front fixing assembly is adapted to be secured to the front pair of escutcheons 52. The front fixing assembly includes support members 76 which are secured by screws (not shown) to the base panel 22. The support members 76 include a recess 76a which is adapted to receive a fixing pin 78 on the vehicle. A support rod 80 is rotatably mounted to the support members 76, and has one or two fixing lugs 82 fixedly mounted thereto. The or each fixing lug 82 is adapted to hook around the fixing pin 78, so that, when the pin 78 is received in the recesses 76a, the lug 82 fixes the support rod 80, the support members 76, and hence the base panel 18, to the vehicle.

A release mechanism is also provided. This comprise s a release member 84 fixedly secured to the support rod 80, a biasing means in the form of a spring 86 attached to the release member 84 and to the base panel 22; for normally biasing the fixing lugs 82 into a position in which they will engage the vehicle fixing pin 78, and a strap or lever 88 secured to the release member 84, such that the support member 80 can be rotated by pulling the strap or lever 88, thereby releasing the fixing lug 82 from the vehicle fixing pin 78 and allowing the unit 10 to be removed.

Figure 4A:
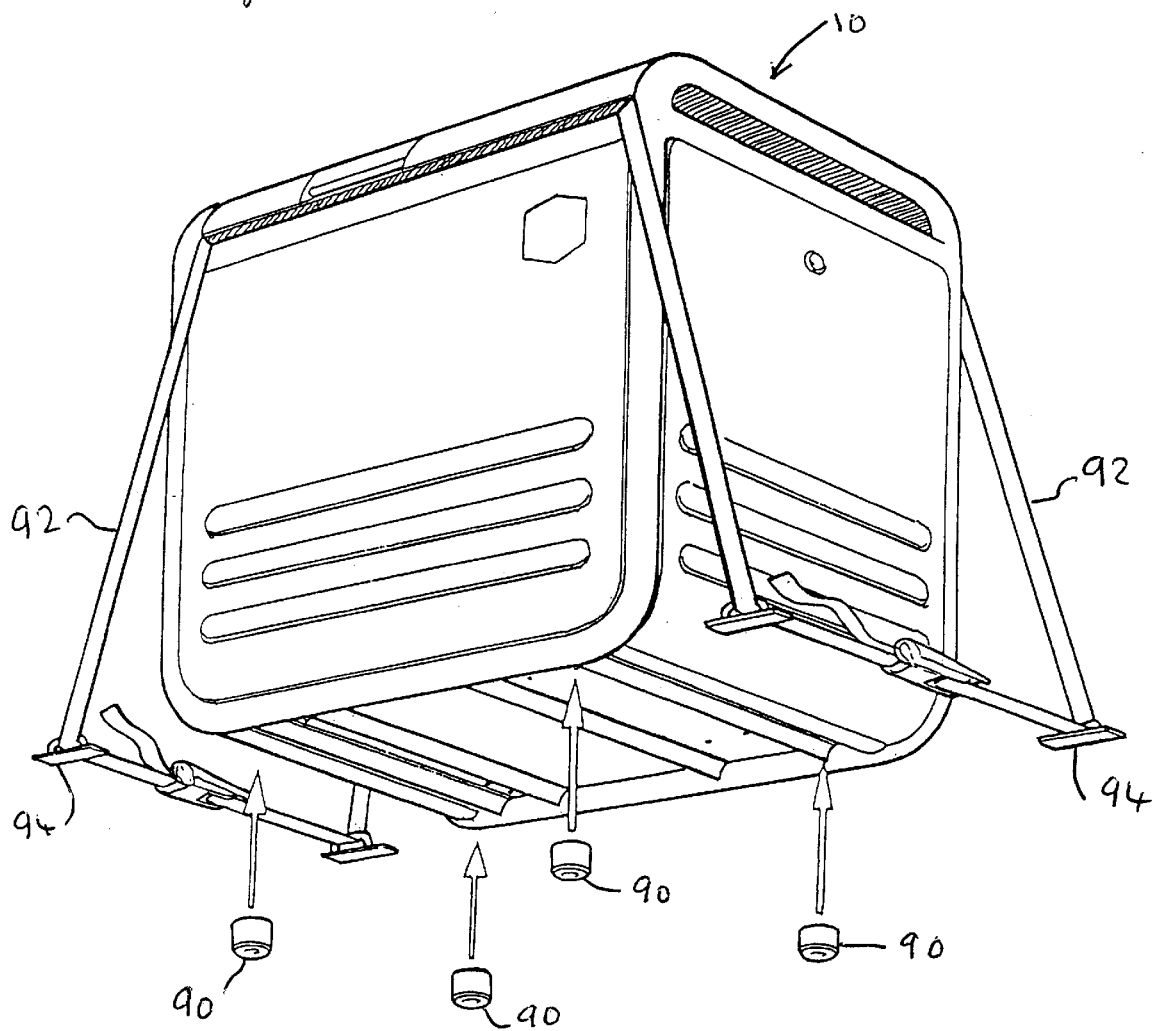
FIG. 4A is an exploded diagram illustrating an a second alternative embodiment of the fixing of the catering unit shown in FIG. 1 to a vehicle.
Figure 4B:
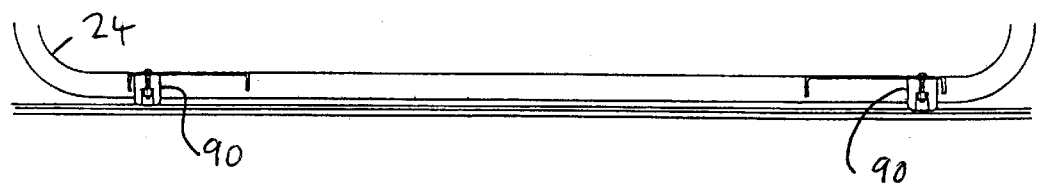
FIG. 4B shows the way in which the catering unit is fixed to the vehicle using the fixing embodiment of FIG. 4A.

FIGS. 4A and 4B illustrate an alternative means of securing the catering unit 10 to a vehicle. The base panel 22 of the catering unit shown in FIGS. 4A and 4B is slightly different from the configuration of the catering unit shown in FIGS. 2A and 2B. Save for this difference, and for differences in the fixing means to be described below, the catering unit 10 shown in FIGS. 4A and 4B is substantially the same as the catering unit 10 shown in FIGS. 1, 2A and 28.

In this embodiment, the base panel is provided with four feet 90 which are secured to the base panel 22 by screws (not shown). The feet 90 are made from rubber or some other material which will provide a high friction contact surface with the vehicle floor. In this embodiment, the unit 10 may be secured to the vehicle in any suitable space, i.e., it does not need to be secured in specially provided fixings on the vehicle. Thus, the unit could be placed in the vehicle's trunk, or in the rear of an estate car or van. In FIG. 4A, straps 92 are shown, which help to secure the unit 10 in position. The straps 92 engage with fixings 94 which would be secured to the vehicle. The straps 92 and the fixings 94 would usually be supplied with the vehicle, but they could be supplied with the unit 10, or separately, if desired.

FIG. 5A shows the seating layout of a seven seat MPV with all the seats 200 mounted in position upon the vehicle floor pan 202. FIG. 5B shows the same layout with the centre seat of the middle row removed, and a catering unit 10 mounted in its place, with lid portions 42 and 44 hinged outward to provide. tables for the two adjacent seats.

In a preferred modification, the rear panel 16 may be hingedly mounted to the frame 24 in the same way as the front panel 14, so that the inferior 30 of the housing 12 can be accessed from both end of the unit 10.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. Accordingly, the foregoing detailed description is to be clearly understood as being given by way of illustration and example only, the spirit and scope of the present invention being limited solely by the appended claims.

What is claimed is:

1. A catering unit comprising:
   a housing;
   a sink disposed in one face of the housing;
   at least one gas burner disposed in said face of the housing;
   a temperature-regulated storage unit disposed within the housing;
   a water supply reservoir disposed within the housing, for supplying water to the sink and a waste water reservoir disposed within the housing, for storing waste water from the sink; and
   hand grips on the unit enabling the unit to be lifted and carried; wherein the size and weight of the catering unit are such that the unit is portable in the sense that it can be placed into and removed from a motor vehicle by hand, whereby the catering unit can be used within the vehicle and can be removed from the vehicle by hand for use outside the vehicle or for storage away from the vehicle.

2. A catering unit according to claim 1, wherein the dimensions of the housing are about 0.7 m×0.7 m×0.7 m or less.

3. A catering unit according to claim 1, wherein the volume of the housing is about 0.3 m$^3$ or less.

4. A catering unit according to claim 1, wherein the volume of the housing is about 0.2 m$^3$ or less.

5. A catering unit according to claim 1, wherein the weight of the unit is about 30 kg or less.

6. A catering unit according to claim 1, further comprising a compartment within the housing for positioning a gas cylinder such that the gas cylinder can supply gas to the gas burner.

7. A catering unit according to claim 1, wherein the water supply reservoir is removable in order to facilitate filling with fresh water.

8. A catering unit according to claim 1, wherein the waste water reservoir is removable in order to facilitate discharge of waste water.

9. A catering unit according to claim 1, wherein the temperature-regulated storage unit comprises a combined hot/cool box.

10. A catering unit according to claim 1, wherein the combined hot/cool box is adapted to be powered by a motor vehicle.

11. A catering unit according to claim 1, wherein doors are provided at two opposite ends of the housing for providing access to the interior of the housing.

12. A catering unit according to claim 1, further comprising securing means for removably securing the catering unit to a motor vehicle.

13. A catering unit according to claim 1, wherein the housing includes an upper lid which is pivotable between a closed position in which the lid covers the sink and the gas burner, and an open position in which the lid exposes the sink and the gas burner for use.

14. A catering unit according to claim 13, wherein the lid is configured such that it can be used as a table when the lid is in the open position.

15. A catering unit according to claim 14, wherein the lid comprises two lid portions each of which is independently movable between the open and closed positions.

16. A catering unit according to claim 15, further comprising two support rails mounted on opposite sides of the housing, and wherein each lid portion is mounted on a respective one of said support rails, whereby, when the lid portions are both pivoted to the open position, a separate table is provided by the lid portions on each side of the housing.

17. A catering unit according to claim 16, wherein the lid portions are slidable along the support rails.

18. A method of providing catering facilities in a multi-purpose vehicle of the type comprising a plurality of vehicle seats at least one of which is removable, said method comprising:

(a) removing at least one of the seats of the multi-purpose vehicle;

(b) securing a catering unit to the multi-purpose vehicle in place of the removed seat, the catering unit comprising a housing; a sink disposed in one face of the housing; a temperature-regulated storage unit disposed within the housing; a water supply reservoir disposed within the housing, for supplying water to the sink; a waste water reservoir disposed within the housing, for storing waste water from the sink; and hand grips on the unit enabling the unit to be lifted and carried; the size and weight of the catering unit being such that the unit is portable in the sense that it can be placed into and removed form a motor vehicle by hand, the catering unit being used within the vehicle and removed from the vehicle by hand for use outside the vehicle or for storage in a location away from the vehicle.

19. A method according to claim 18, wherein the catering, unit is secured to the vehicle using the vehicle fixings provided for securing the removed seat to the vehicle.

20. A catering unit comprising:

a housing;

a sink disposed in one face of the housing;

at least one gas burner disposed in said face of the housing;

a temperature-regulated storage unit disposed within the housing;

a water supply reservoir disposed within the housing, for supplying water to the sink;

a waste water reservoir disposed within the housing, for storing waste water from the sink;

a door in at least one end of the housing for accessing an interior thereof;

tops lids which form a cover for the housing and which open up to form work surfaces which also incorporate landing space for beverage containers; and hand grips on the unit enabling the unit to be lifted and carried, wherein the size and weight of the catering unit are such that the unit is portable in the sense that it can be placed into and removed from a motor vehicle by hand, whereby the catering unit can be used within the vehicle and can be removed from the vehicle by hand for use outside the vehicle or for storage in a location away from the vehicle.

* * * * *